US010869374B2

United States Patent
Maeda et al.

(10) Patent No.: US 10,869,374 B2
(45) Date of Patent: Dec. 15, 2020

(54) POWER SUPPLY DEVICE, LIGHTING EQUIPMENT, AND METHOD FOR MANUFACTURING POWER SUPPLY DEVICE

(71) Applicants: Mitsubishi Electric Corporation, Tokyo (JP); Mitsubishi Electric Lighting Corporation, Kamakura (JP)

(72) Inventors: Takashi Maeda, Kanagawa (JP); Shinsuke Funayama, Kanagawa (JP); Teiji Ohtsu, Kanagawa (JP)

(73) Assignees: MISTUBISHI ELECTRIC CORPORATION, Tokyo (JP); MITSUBISHI ELECTRIC LIGHTING CORPORATION, Kanagawa (JP)

( * ) Notice: Subject to any disclaimer, the term of this patent is extended or adjusted under 35 U.S.C. 154(b) by 0 days.

(21) Appl. No.: 16/462,777

(22) PCT Filed: Nov. 17, 2017

(86) PCT No.: PCT/JP2017/041427
§ 371 (c)(1),
(2) Date: May 21, 2019

(87) PCT Pub. No.: WO2018/101081
PCT Pub. Date: Jun. 7, 2018

(65) Prior Publication Data
US 2019/0373688 A1    Dec. 5, 2019

(30) Foreign Application Priority Data
Dec. 2, 2016   (JP) .................................. 2016-234706

(51) Int. Cl.
*H05B 45/50* (2020.01)
*H02M 7/06* (2006.01)

(52) U.S. Cl.
CPC ............... *H05B 45/50* (2020.01); *H02M 7/06* (2013.01)

(58) Field of Classification Search
None
See application file for complete search history.

(56) References Cited

U.S. PATENT DOCUMENTS

| | | | | |
|---|---|---|---|---|
| 6,806,445 B2 * | 10/2004 | Satoh | ................. | G03G 15/2039 219/481 |
| 2008/0198527 A1 * | 8/2008 | Higashi | .................. | H02H 9/042 361/118 |
| 2010/0231138 A1 | 9/2010 | Mizukawa et al. | | |

FOREIGN PATENT DOCUMENTS

| JP | S63149152 A | 6/1988 |
|---|---|---|
| JP | H03030733 U | 3/1991 |

(Continued)

OTHER PUBLICATIONS

International Search Report (with English translation) and Written Opinion issued in corresponding International Patent Application No. PCT/JP2017/041427, 11 pages (dated Feb. 6, 2018).

(Continued)

*Primary Examiner* — Crystal L Hammond
(74) *Attorney, Agent, or Firm* — Buchanan Ingersoll & Rooney PC (57) ABSTRACT

An input connection part having a first connection part and a second connection part, an anti-surge circuit having a first varistor and a second varistor which are connected in series so as to connect the first connection part and the second connection part, and a lightning arrester device connecting a connection point of the first varistor and the second varistor and a grounding connection part, and a power supply circuit connected to the anti-surge circuit are provided, wherein capacitances of the first varistor and the second varistor are any values from a value of 1.6 times a (Continued)

nominal capacitance of the first varistor and the second varistor to a value of 0.4 times the nominal capacitance.

14 Claims, 4 Drawing Sheets

(56) References Cited

FOREIGN PATENT DOCUMENTS

| | | |
|---|---|---|
| JP | H05308721 A | 11/1993 |
| JP | 2008206263 A | 9/2008 |
| JP | 2009232629 A | 10/2009 |
| JP | 2013211119 A | 10/2013 |
| JP | 5462492 B2 | 4/2014 |

OTHER PUBLICATIONS

Office Action (Notice of Reasons for Refusal) dated Apr. 14, 2020, by the Japanese Patent Office in corresponding Japanese Patent Application No. 2018-553780 and English translation of the Office Action. (11 pages).

Japanese Office Action dated Oct. 13, 2020 issued by the Japan Patent Office in corresponding Japanese Patent Application No. 2018-553780, with English translation (9 pages).

* cited by examiner

| | Capacitance | -Dispersion | +Dispersion | Min | Max |
|---|---|---|---|---|---|
| Z1 | 430pF | 11% | 11% | 383pF | 477pF |
| Z2 | 430pF | 11% | 11% | 383pF | 477pF |

POWER SUPPLY DEVICE, LIGHTING EQUIPMENT, AND METHOD FOR MANUFACTURING POWER SUPPLY DEVICE

FIELD

The present invention relates to a power supply device which supplies current to a light source unit, lighting equipment including the power supply device, and a method for manufacturing the power supply device.

BACKGROUND

PTL 1 discloses an LED power supply circuit, and lighting equipment using the same. In this LED power supply circuit, a capacitor is inserted from an input power supply line between a line filter and a diode bridge with respect to the earth, the total capacitance from the power supply line with respect to the earth is set to be not more than $\frac{1}{200}$ of that of a smoothing capacitor. Thereby, in an LED power supply circuit using a DC-DC converter circuit, high frequency noise propagating to the input power supply line is reduced, and lightning surge performance is improved.

PRIOR ART

Patent Literature

Patent Literature 1: JP 2010-178571 A

SUMMARY

Technical Problem

A power supply device connected to an AC power supply and supplying current to a light source unit is needed to be protected from an external surge and a line-to-line surge. In order to protect the power supply device from the external surge such as a lightning surge, a first varistor and a lightning arrester device such as an arrester are occasionally connected in series from one electrode of the AC power supply with respect to the earth, a second varistor and a lightning arrester device being connected in series from the other electrode of the AC power supply with respect to the earth. Thereby, a surge arising between the power supply device and the earth is suppressed.

In order to suppress the line-to-line surge, the one electrode and the other electrode of the AC power supply are occasionally connected with a third varistor. The third varistor suppresses a surge, so called, that arises between the lines. A circuit for protecting the power supply device from surges as above is called an anti-surge circuit. Notably, a varistor is a device which exhibits a high resistance value at low voltage and reduces its resistance value to cause a large current to flow in the case of exceeding a predefined voltage.

Now, capacitances of varistors have some dispersion. For example, there is occasionally a case where the capacitance of a varistor has a value larger than its nominal capacitance by 100% and the capacitance of another varistor has a value smaller than the nominal capacitance by 50%. In this case, most of the voltage of the AC power supply is to be applied to a first varistor, and little voltage is to be applied to a second varistor from the AC power supply.

Accordingly, taking account of such dispersion of capacitances of varistors, the voltage at which the first varistor and the second varistor maintain their high resistances has to be set high. Setting the voltage at which the first varistor and the second varistor maintain their high resistances to be high means that a high voltage is applied to the downstream power supply circuit. There has been a problem in such a case that the power supply device has to be upsized for ability of withstanding the high voltage.

The present invention is devised in order to solve the aforementioned problem, and an object thereof is to provide a power supply device, lighting equipment, and a method for manufacturing a power supply device capable of realizing anti-surge measures with the saving of components while preventing the power supply device from being upsized.

Means for Solving the Problems

According to a present invention, a power supply device includes an input connection part having a first connection part and a second connection part, an anti-surge circuit having a first varistor and a second varistor which are connected in series so as to connect the first connection part and the second connection part, and a lightning arrester device connecting a connection point of the first varistor and the second varistor and a grounding connection part, and a power supply circuit connected to the anti-surge circuit, wherein capacitances of the first varistor and the second varistor are any values from a value of 1.6 times a nominal capacitance of the first varistor and the second varistor to a value of 0.4 times the nominal capacitance.

According to a present invention, a method for manufacturing a power supply device includes a step of selecting a first varistor and a second varistor having any capacitances from a value of 1.6 times a nominal capacitance to a value of 0.4 times the nominal capacitance, and a step of connecting a first connection part and a second connection part with the first varistor and the second varistor connected in series, connecting a connection point of the first varistor and the second varistor and a grounding connection part with a lightning arrester device, and thereby, providing an anti-surge circuit having the first varistor, the second varistor and the lightning arrester device, wherein a power supply circuit is connected to the anti-surge circuit.

Advantageous Effect of Invention

According to the present invention, by limiting dispersion of capacitances of a first varistor and a second varistor, anti-surge measures can be realized with the saving of components while preventing a power supply device from being upsized.

DESCRIPTION OF EMBODIMENTS

A power supply device, lighting equipment, and a method for manufacturing a power supply device according to an embodiment of the present invention are described with reference to the drawings. The same or corresponding components are given the same signs and their duplicate description is occasionally omitted.

Embodiment

Figure 1:
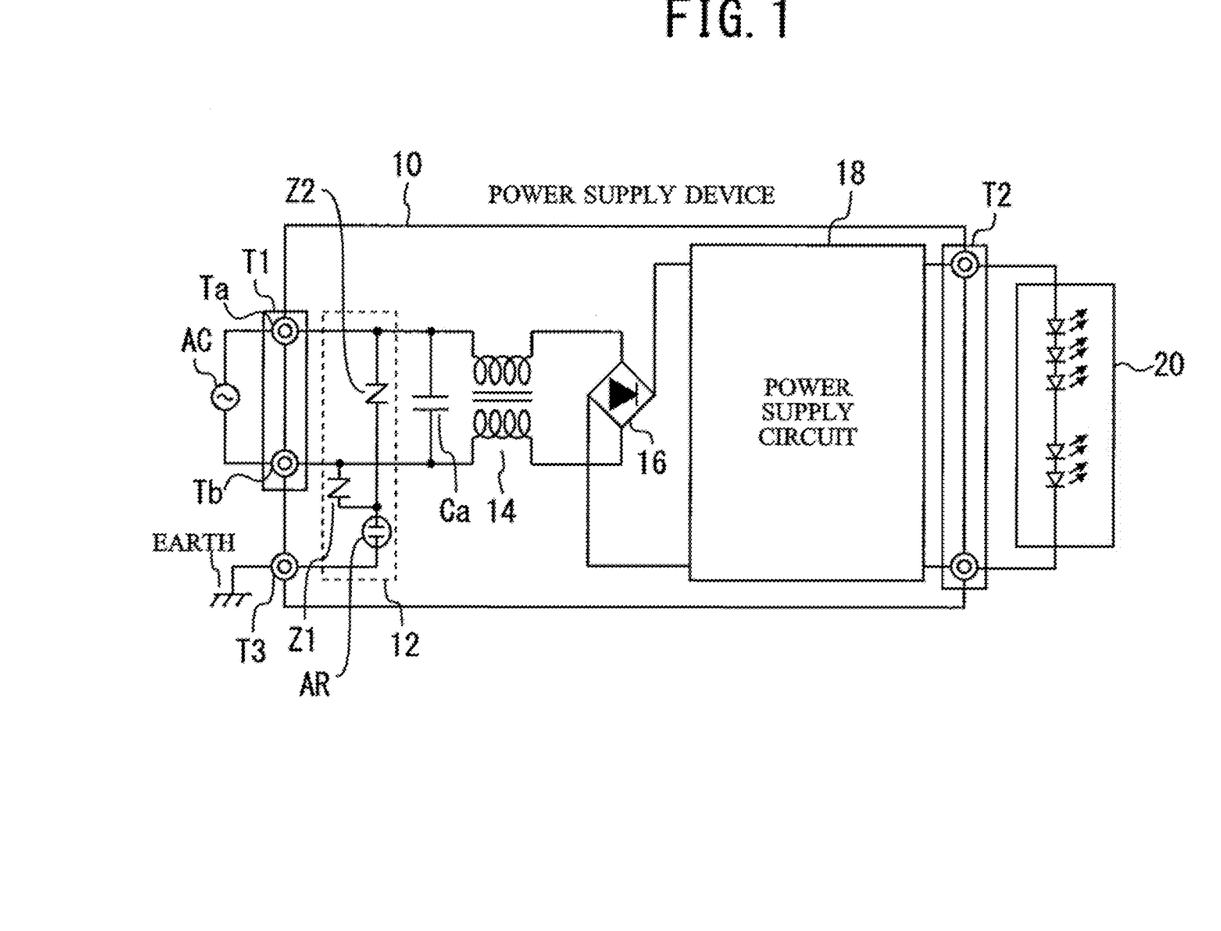
FIG. 1 is a circuit diagram of lighting equipment according to an embodiment.

FIG. 1 is a circuit diagram of lighting equipment according to an embodiment. A power supply device 10 includes, as interfaces to the outside, an input connection part T1 having a first connection part Ta and a second connection part Tb, an output connection part T2, and a grounding connection part T3. An AC power supply AC is connected to the input connection part T1. A light source unit 20 is connected to the output connection part T2. The light source unit 20 is, for example, an LED module. The grounding connection part T3 is connected to the earth.

The power supply device 10 includes an anti-surge circuit 12 connected to the input connection part T1. The anti-surge circuit 12 includes a first varistor Z1, a second varistor Z2 and an arrester AR. The first varistor Z1 and the second varistor Z2 are connected in series so as to connect the first connection part Ta and the second connection part Tb. The arrester AR connects a connection point of the first varistor Z1 and the second varistor 22, and the grounding connection part T3.

The anti-surge circuit 12 is connected to a power supply circuit 18 via a capacitor Ca, a common mode choke coil 14 and a diode bridge 16. The power supply circuit 18 is connected to the light source unit 20 via the output connection part T2. The power supply circuit 18 is a circuit which supplies current to the light source unit 20. The power supply circuit 18 includes, for example, a power factor correction circuit and a buck converter circuit.

When an external surge such as a lightning surge arises, the resistance value of the first varistor Z1 is largely reduced, a current flows through the first varistor Z1 and the arrester AR connected in series, and thereby, the power supply circuit 18 is protected. Otherwise, the resistance value of the second varistor Z2 is largely reduced, a current flows through the second varistor Z2 and the arrester AR connected in series, and thereby, the power supply circuit 18 is protected. Meanwhile, a line-to-line surge between one electrode of the AC power supply AC and the other electrode thereof is suppressed by the first varistor Z1 and the second varistor Z2 connected in series with respect to the AC power supply AC, and thereby, the power supply circuit 18 is protected.

(Consideration on Capacitances)

Here, the capacitances of the first varistor Z1 and the second varistor Z2 are considered. A voltage Vz0 [V] applied to the first varistor Z1 by the AC power supply AC is expressed by the following expression 1.

$$Vz0=Vac\times[C1/(C1+C2)] \qquad \text{expression 1}$$

Here, Vac is a voltage [V] of the AC power supply AC, C1 is a capacitance [μF] of the first varistor Z1, and C2 is a capacitance [μF] of the second varistor Z2.

When only the voltage Vz0 [V] is applied to the first varistor Z1 by the AC power supply AC, the first varistor Z1 should maintain a high resistance value. Therefore, the following expression 2 is needed to be satisfied, where a nominal value of the maximum voltage at which the first varistor Z1 can maintain the high resistance value is VzMAX [V].

$$Vz0 \leq VzMAX \qquad \text{expression 2}$$

Accordingly, it is apparent that the higher the voltage Vz0 [V] applied to the first varistor Z1 is, the higher VzMAX of the first varistor Z1 has to be set. The same discussion also applies to the second varistor Z2, and the higher the voltage Vz0 applied to the second varistor Z2 by the AC power supply AC is, the higher the nominal value VzMAX of the second varistor has to be set.

There is relatively wide dispersion of capacitances of varistors. The capacitance of a varistor actually manufactured is within a range of C+α to C−α, where the nominal capacitance of the varistor is C [μF], and the dispersion is a. Therefore, the difference between C1 and C2 is at its maximum in the following case:

$$C1=C(1+\alpha)$$

$$C2=C(1-\alpha)$$

In the worst case where the difference between C1 and C2 is at its maximum, the voltage Vz0 [V] applied to the first varistor Z1 from the AC power supply AC is as follows.

$$Vac\times C(1+\alpha)/[C(1+\alpha)+C(1-\alpha)]=Vz0 \leq Vz \text{ MAX}$$

Transformation of this expression can obtain the following condition 1.

$$Vz \text{ MAX} \geq Vac\times[(1+\alpha)/2] \qquad \text{condition 1}$$

The dispersion α is ideally zero. When the dispersion α is zero, a half the voltage of the AC power supply AC is applied to the first varistor Z1, and the remaining half the voltage is applied to the second varistor Z2. Nevertheless, α actually takes a value larger than zero, and when the first varistor Z1 and the second varistor Z2 are selected at random, a commensurate imbalance arises between the capacitances of both. For example, when a capacitance ratio between the first varistor Z1 and the second varistor Z2 is 2:1, two thirds the voltage of the AC power supply AC is applied to the first varistor Z1, and one third the voltage of the AC power supply AC is applied to the second varistor Z2.

It is apparent based on condition 1 that the larger the dispersion α of capacitances is, the larger the nominal value VzMAX of the first varistor Z1 has to be set. For example, when the capacitance of the first varistor Z1 is twice the nominal capacitance, α is one. When one is assigned for α in condition 1, VzMAX is expressed as the following expression 3.

$$Vz \text{ MAX} \geq Vac \qquad \text{expression 3}$$

For example, when it is supposed that a of the first varistor Z1 is one, α of the second varistor Z2 is −0.5, and the voltage of the AC power supply AC is 270 V, and these are assigned in expression 1, the voltage Vz0 applied to the first varistor Z1 equals 270×[2C/(2C+0.5C)]=216 [V]. Accordingly, VzMAX of the first varistor Z1 has to be set to be 216 V. In this case, although varistors, for example, with 220 V of VzMAX may be used, the first varistor and the second varistor with 264 V of VzMAX are to be selected with approximately 20% of margins.

When the first varistor Z1 and the second varistor Z2 with 264 V of VzMAX are selected, it is not until the external surge between the lines exceeds 528 V that the anti-surge circuit 12 starts to function. Therefore, the components such as the power supply circuit 18 have to be able to withstand the high voltage up to 528 V. In general, enhancement of the withstand voltages causes the components to be upsized. Therefore, when α of the first varistor Z1 is one, and α of the second varistor Z2 is −0.5, the power supply device 10 is inevitably upsized.

In order to prevent the power supply device 10 from being upsized, one electrode of the AC power supply AC and the other electrode thereof have been conventionally connected with a third varistor to suppress a surge, so called, that arises between the lines. Since VzMAX of the third varistor is needed to be higher than the voltage of the AC power supply AC, 270 V, it is set to be, for example, approximately 300 V. This allows an external surge exceeding 300 V to be absorbed via the third varistor, and hence, the withstand voltages of the components such as the power supply circuit 18 are sufficient to be approximately 300 V. Although providing the third varistor can accordingly prevent the power supply circuit 18 from being upsized, in the first place, providing the third varistor causes the power supply device to be upsized.

(How to Determine Capacitances in Embodiment of the Present Invention)

When it is supposed to omit such a third varistor, taking account of the worst case of the dispersion α in capacitances of the first varistor Z1 and the second varistor Z2, VzMAX has to be set so as to meet the case, and hence, VzMAX has to be made larger as α is larger. Accordingly, the power supply device 10 cannot be prevented from being upsized unless α is managed.

A method for manufacturing a power supply device according to an embodiment of the present invention is described. First, the first varistor Z1 and the second varistor 22 having any capacitances from the value of 1.6 times the nominal capacitance to the value of 0.4 times the nominal capacitance are selected. This step is called a varistor selection step. Capacitances of varistors generally have wide dispersion, and in this step, varistors with capacitances not largely separate from the nominal capacitance are selected as the first varistor Z1 and the second varistor Z2 employed for the power supply device 10.

When the first varistor Z1 and the second varistor Z2 having any capacitances from the value of 1.6 times the nominal capacitance to the value of 0.4 times the nominal capacitance are selected as above, α of the first varistor Z1 and the second varistor Z2 is at most 0.6. When 0.6 is assigned for α in the aforementioned "condition 1", the following expression 4 can be obtained.

$Vz\ MAX \geq Vac \times [(1+0.6)/2] = 0.8 Vac$    expression 4

In order to secure reliability of the first varistor Z1 and the second varistor Z2, a voltage which is applied to these varistors by the AC power supply AC is preferably not more than 80% of Vac. In this case, the expression for the "condition 1" is transformed as the following expression 5.

$Vac \times [(1+\alpha)/2] \leq VzMAX = 0.8 Vac$    expression 5

Transformation of expression 5 can obtain the following expression 6.

$(1+\alpha)/2 \leq 0.8$    expression 6

Transformation of expression 6 can obtain the following expression 7.

$\alpha \leq 0.6$    expression 7

In the varistor selection step, based on expression 7, varistors with α from 0 to 0.6 are selected. In other words, the first varistor Z1 and the second varistor Z2 having any capacitances from the value of 1.6 times the nominal capacitance to the value of 0.4 times the nominal capacitance are selected.

After the first varistor Z1 and the second varistor Z2 are selected, the first varistor Z1 and the second varistor Z2 connected in series connect the first connection part Ta and the second connection part Tb. Then, the arrester AR connects the connection point of the first varistor Z1 and the second varistor 22, and the grounding connection part T3, and thereby, the anti-surge circuit 12 having the first varistor Z1, the second varistor Z2 and the arrester AR is provided. The power supply circuit 18 is connected to this anti-surge circuit 12, and thereby, the power supply device 10 in FIG. 1 is completed.

When it is supposed that the capacitance C1 of the first varistor Z1 is C(1+α)=1.6C, the capacitance C2 of the second varistor Z2 is (1−α)=0.4C, and the voltage of the AC power supply AC is 270 V, expression 1 is as follows.

$$Vz0 = Vac \times [C1/(C1+C2)]$$
$$= 270 \times [C \times 1.6/(C \times 1.6 + C \times 0.4)]$$
$$= 270 \times 0.8$$
$$= 216$$

Accordingly, varistors with VzMAX not less than 216 V are needed to be selected for the first varistor Z1 and the second varistor Z2. VzMAX needed for providing 20% of margin is 259 V. In this case, the anti-surge circuit can absorb a line-to-line surge not less than 518 V, and the power supply circuit 18 needs a withstand voltage of approximately 518 V. Since α of the first varistor Z1 and the second varistor Z2 is limited to be not more than 0.6 in the embodiment of the present invention, the withstand voltage of the power supply circuit 18 is sufficient to be set larger than the value of 1.6 times the voltage applied to the input connection part T1.

As above, the dispersion of capacitances of the first varistor Z1 and the second varistor Z2 according to the embodiment of the present invention is made small, and thereby, a line-to-line surge relatively small can be absorbed by the anti-surge circuit 12. Therefore, the power supply circuit 18 and the like downstream of the anti-surge circuit 12 can be prevented from being upsized. Besides, since the third varistor is supposed not to be used, anti-surge measures can be realized with the saving of components.

Figure 2:
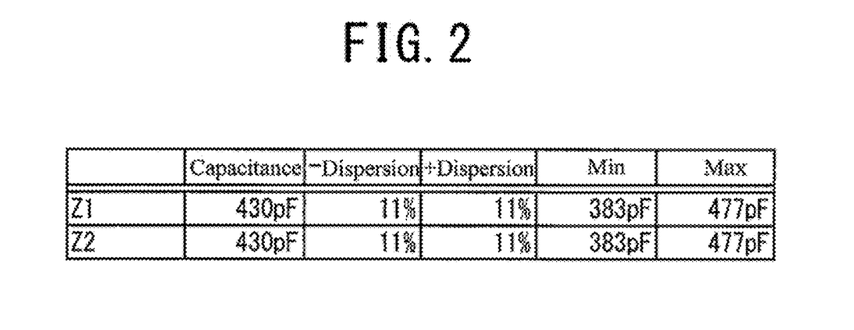
FIG. 2 is a table presenting capacities.
Figure 3:
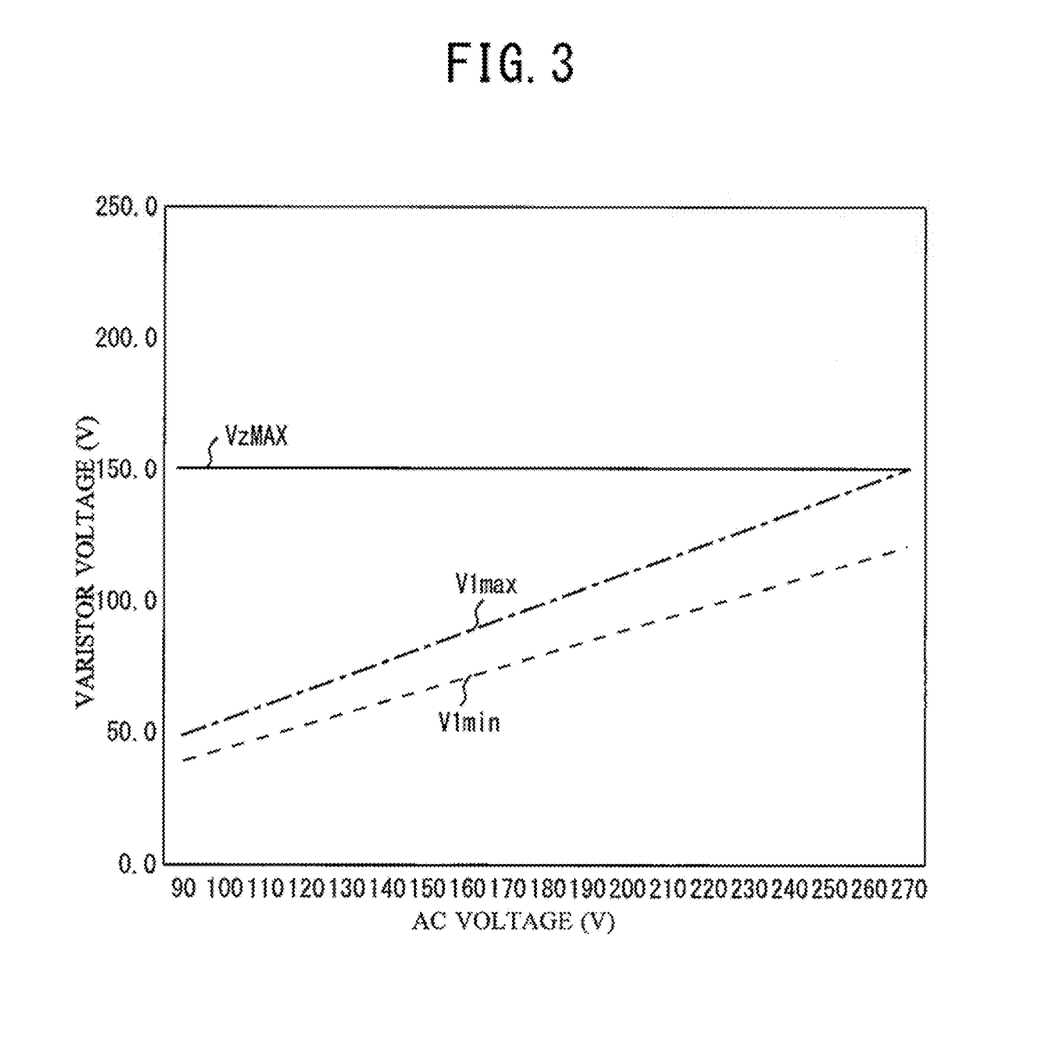
FIG. 3 is a graph presenting the variation of voltage applied to the varistor in response to the change of the AC power supply.

FIG. 2 is a table presenting minimum capacities and maximum capacities of the first varistor Z1 and the second varistor Z2 when α is set to be 0.11. FIG. 3 is a graph presenting the maximum value and the minimum value of a voltage applied to the first varistor Z1 when the first varistor Z1 and the second varistor Z2 having the dispersion illustrated in FIG. 2 are employed and the voltage of the AC power supply AC is being changed. When α is 0.11, setting VzMAX of the first varistor Z1 up to approximately 150 V attains the resistance value of the first varistor Z1 not to largely reduce in normal operation with the AC power supply AC. In other words, when VzMAX is set to be 150 V, α has to be not more than 0.11. The dispersion α of capacitances of varistors is regulated as above, and thereby, the first varistor Z1 and the second varistor Z2 that satisfy VzMAX<Vac can be selected.

Allowable voltages of the first varistor Z1 and the second varistor Z2 can be made smaller than the voltage input to the first connection part Ta and the second connection part Tb. Here, the allowable voltages are the upper limits of voltages that can be continuously applied to the first varistor Z1 and the second varistor Z2. When voltages not less than the allowable voltages are being applied to the first varistor Z1 and the second varistor Z2 for a long time, the first varistor Z1 and the second varistor Z2 deteriorate.

Figure 4:
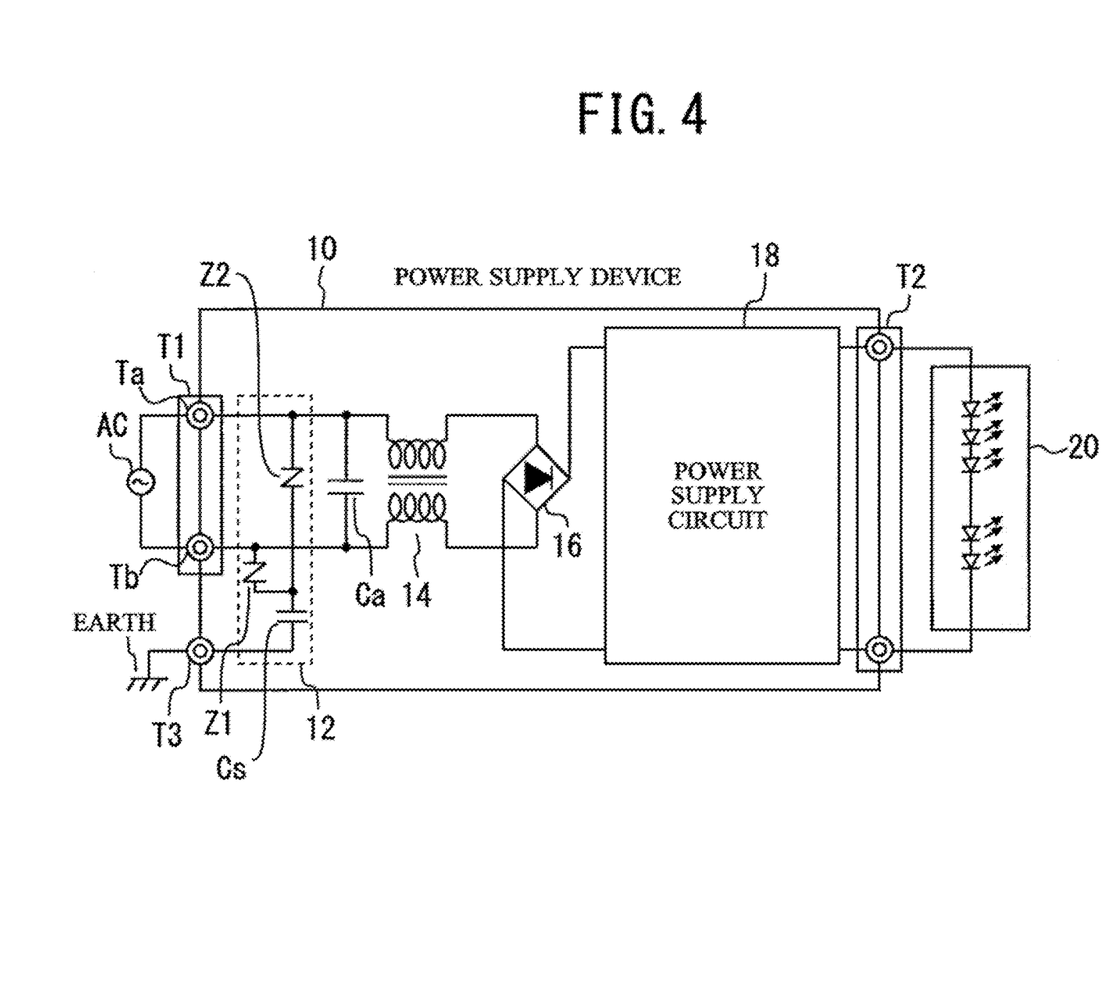
FIG. 4 is a circuit diagram of lighting equipment according to a modification.

The arrester AR can be replaced by another lightning arrester device. FIG. 4 is a circuit diagram of lighting equipment according to a modification. The arrester AR in FIG. 1 is replaced by a capacitor Cs. The capacitor Cs connects the connection point of the first varistor Z1 and the second varistor Z2, and the grounding connection part T3. The capacitor Cs functions as a lightning arrester device.

Figure 5:
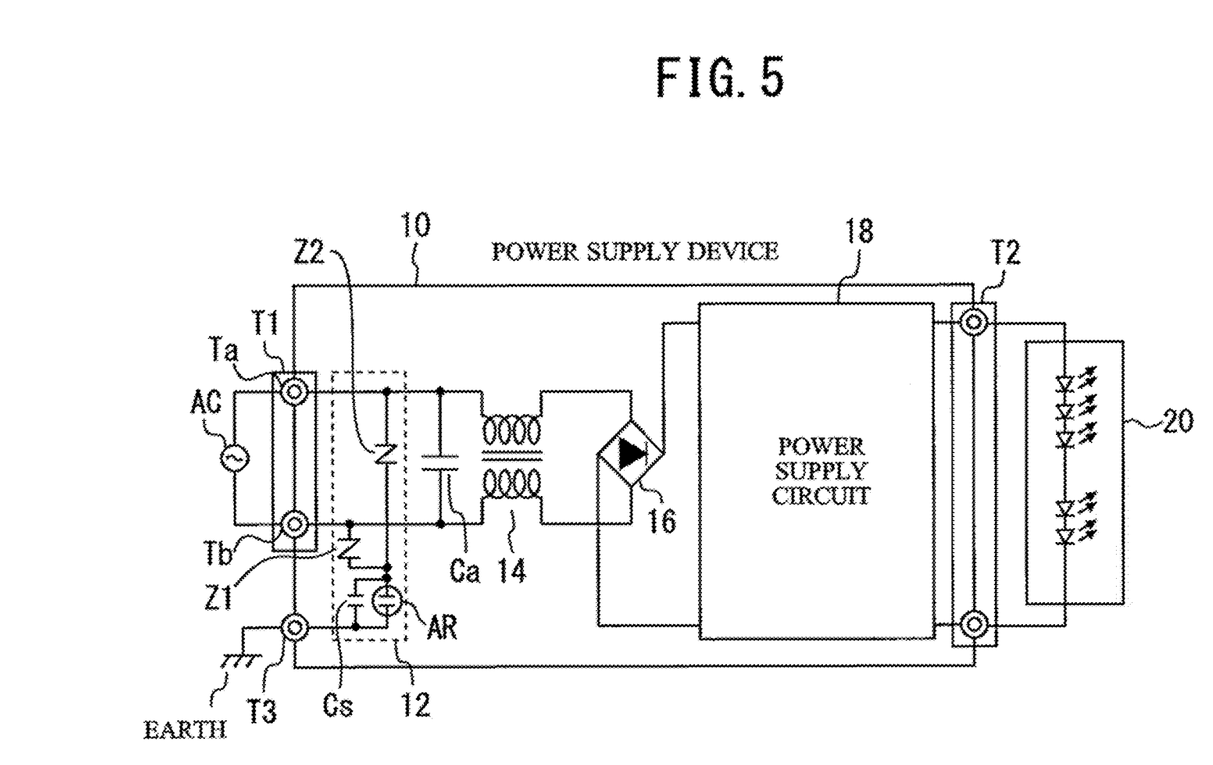
FIG. 5 is a circuit diagram of lighting equipment according to another modification.

FIG. 5 is a circuit diagram of lighting equipment according to another modification. The capacitor Cs is connected to the arrester AR in parallel. A parallel circuit of the arrester AR and the capacitor Cs connects the connection point of the first varistor Z1 and the second varistor Z2, and the grounding connection part T3. The arrester AR and the capacitor Cs function as a lightning arrester device. As above, lightning arrester devices of various types can be used in place of the arrester AR in FIG. 1. Notably, such a lightning arrester device is occasionally called a lightning arrester or a power supply SPD (Surge Protective Device).

DESCRIPTION OF SYMBOLS 10 power supply device, 12 anti-surge circuit, 18 power supply circuit, Z1 first varistor, Z2 second varistor, AR arrester

The invention claimed is:

1. A power supply device comprising:
an input connection part having a first connection part and a second connection part;
an anti-surge circuit having a first varistor and a second varistor which are connected in series so as to connect the first connection part and the second connection part, and a lightning arrester device connecting a connection point of the first varistor and the second varistor and a grounding connection part; and
a power supply circuit connected to the anti-surge circuit, wherein a maximum voltage (VzMAX) at which the first varistor or the second varistor maintains a high resistance is such that VzMAX≥Vac×[(1+α)/2], wherein Vac is a voltage of an AC power supply applied to the input connection part, and α equals a dispersion of capacitance values of the first varistor and the second varistor such that C1=C(1+α) and C2=C(1−α) such that the first varistor and the second varistor have capacitance values (C1 and C2, respectively) between 1.6 times a nominal capacitance (C) of the first varistor and the second varistor and 0.4 times the nominal capacitance (C).

2. The power supply device according to claim 1, wherein an allowable voltage of the first varistor and the second varistor is smaller than a voltage input to the first connection part and the second connection part.

3. The power supply device according to claim 2, wherein a withstand voltage of the power supply circuit is set to be larger than a value of 1.6 times the voltage applied to the input connection part.

4. The power supply device according to claim 3, wherein the lightning arrester device is an arrester, a capacitor or a parallel circuit of an arrester and a capacitor.

5. The power supply device according to claim 2, wherein the lightning arrester device is an arrester, a capacitor or a parallel circuit of an arrester and a capacitor.

6. The power supply device according to claim 1, wherein a withstand voltage of the power supply circuit is set to be larger than a value of 1.6 times the voltage applied to the input connection part.

7. The power supply device according to claim 6, wherein the lightning arrester device is an arrester, a capacitor or a parallel circuit of an arrester and a capacitor.

8. The power supply device according to claim 1, wherein the lightning arrester device is an arrester, a parallel circuit of an arrester and a capacitor.

9. A lighting equipment comprising:
a power supply device comprising an input connection part having a first connection part and a second connection part, an anti-surge circuit having a first varistor and a second varistor which are connected in series so as to connect the first connection part and the second connection part, and a lightning arrester device connecting a connection point of the first varistor and the second varistor and a grounding connection part, and a power supply circuit connected to the anti-surge circuit, wherein a maximum voltage (VzMAX) at which the first varistor or the second varistor maintains a high resistance is such that VzMAX≥Vac×[(1+α)/2], wherein Vac is a voltage of an AC power supply applied to the input connection part, and α equals a dispersion of capacitance values of the first varistor and the second varistor such that C1=C(1+α) and C2=C(1−α) such that the first varistor and the second varistor have capacitance values (C1 and C2, respectively) between 1.6 times a nominal capacitance (C) of the first varistor and the second varistor and 0.4 times the nominal capacitance (C), and
a light source unit connected to the power supply circuit.

10. The lighting equipment according to claim 9, wherein an allowable voltage of the first varistor and the second varistor is smaller than a voltage input to the first connection part and the second connection part.

11. The lighting equipment according to claim 9, wherein a withstand voltage of the power supply circuit is set to be larger than a value of 1.6 times a voltage applied to the input connection part.

12. The lighting equipment according to claim 9, wherein the lightning arrester device is an arrester, a capacitor or a parallel circuit of an arrester and a capacitor.

13. A method for manufacturing a power supply device comprising:
selecting a first varistor and a second varistor, wherein a maximum voltage (VzMAX) at which the first varistor or the second varistor maintains a high resistance is such that VzMAX≥Vac×[(1+α)/2], wherein Vac is a voltage of an AC power supply applied to an input connection part of the power supply device, and α equals a dispersion of capacitance values of the first varistor and the second varistor such that C1=C(1+α) and C2=C(1−α) such that the first varistor and the second varistor have capacitance values (C1 and C2, respectively) between 1.6 times a nominal capacitance (C) and 0.4 times the nominal capacitance (C); and
connecting a first connection part and a second connection part with the first varistor and the second varistor connected in series, connecting a connection point of the first varistor and the second varistor and a grounding connection part with a lightning arrester device, and thereby, providing an anti-surge circuit having the first varistor, the second varistor and the lightning arrester device, wherein
a power supply circuit is connected to the anti-surge circuit.

14. The method for manufacturing a power supply device according to claim 13, wherein a withstand voltage of the power supply circuit is set to be larger than a value of 1.6 times a voltage applied to the input connection part having the first connection part and the second connection part.

* * * * *